US012764184B2

(12) United States Patent
Niu

(10) Patent No.: US 12,764,184 B2
(45) Date of Patent: Oct. 13, 2026

(54) METHOD FOR PROVIDING UPNP SERVICE, GATEWAY DEVICE, STORAGE MEDIUM AND PROGRAM PRODUCT

(71) Applicant: Thomson Licensing, Cesson-Sevigne (FR)

(72) Inventor: Lijie Niu, Shenzhen (CN)

(73) Assignee: Thomon Licensing, Cesson-Sevigne (FR)

( * ) Notice: Subject to any disclaimer, the term of this patent is extended or adjusted under 35 U.S.C. 154(b) by 27 days.

(21) Appl. No.: 18/843,801

(22) PCT Filed: Mar. 14, 2023

(86) PCT No.: PCT/US2023/015154
§ 371 (c)(1),
(2) Date: Sep. 4, 2024

(87) PCT Pub. No.: WO2023/183159
PCT Pub. Date: Sep. 28, 2023

(65) Prior Publication Data

US 2025/0227145 A1 Jul. 10, 2025

(30) Foreign Application Priority Data

Mar. 24, 2022 (CN) ......................... 202210300235.7

(51) Int. Cl.
*H04L 67/104* (2022.01)
*H04L 9/40* (2022.01)
(Continued)

(52) U.S. Cl.
CPC ............ *H04L 67/104* (2013.01); *H04L 12/66* (2013.01); *H04L 63/101* (2013.01); *H04L 67/125* (2013.01)

(58) Field of Classification Search
CPC ..... H04L 67/104; H04L 67/125; H04L 12/66; H04L 63/101
See application file for complete search history.

(56) References Cited

U.S. PATENT DOCUMENTS

| | | | | |
|---|---|---|---|---|
| 2003/0126239 | A1 | 7/2003 | Hwang | |
| 2007/0147396 | A1 * | 6/2007 | Lee | H04L 67/56 370/465 |

(Continued)

FOREIGN PATENT DOCUMENTS

| | | |
|---|---|---|
| EP | 2 738 992 | 6/2014 |
| WO | 2009/158530 | 12/2009 |

OTHER PUBLICATIONS

International Preliminary Report on Patentability dated Sep. 24, 2024 in International (PCT) Application No. PCT/US2023/015154.

(Continued)

*Primary Examiner* — David R Lazaro
*Assistant Examiner* — Xiang Yu
(74) *Attorney, Agent, or Firm* — James Shead; David Todd Shoneman; Michael A. Pugel

(57) ABSTRACT

The content of the present disclosure relates to a method for providing UPNP service, a gateway device, a storage medium and a program product. In the method, the gateway device acquires a device list comprising preset device type information related to a preset device type; acquires terminal device information of the terminal device based on the terminal device connecting to the gateway device, and compares the terminal device information with the preset device type information; determines that the terminal device information matches the preset device type information; and provides UPNP service to the terminal device based on the determination. Through the intelligent control of the UPNP function on the gateway device, a balance may be struck (Continued)

between the communication needs of devices that require UPNP service and network security.

20 Claims, 4 Drawing Sheets

(51) Int. Cl.
*H04L 12/66* (2006.01)
*H04L 67/125* (2022.01)

(56) References Cited

U.S. PATENT DOCUMENTS

| | | | | |
|---|---|---|---|---|
| 2007/0214241 | A1 | 9/2007 | Song et al. | |
| 2012/0151058 | A1* | 6/2012 | Lee | H04L 47/70 709/225 |
| 2017/0311224 | A1* | 10/2017 | Wang | H04L 61/2528 |
| 2018/0124009 | A1* | 5/2018 | Kerkes | H04L 61/58 |

OTHER PUBLICATIONS

International Search Report and the Written Opinion of the International Searching Authority dated Jun. 23, 2023 in International (PCT) Application No. PCT/US2023/01514.

* cited by examiner

Gateway device 110

| OUI | Device name |
|---|---|
| BC01AB | Xbox 360 |
| EFC576 | ROKU xx TV |
| 32C65F | iPad |

METHOD FOR PROVIDING UPNP SERVICE, GATEWAY DEVICE, STORAGE MEDIUM AND PROGRAM PRODUCT

TECHNICAL FIELD

The present disclosure relates to the field of network communication and more specifically, to a method for providing universal plug-and-play (UPNP) service, a gateway device, a storage medium and a program product in the field of network communication.

BACKGROUND ART

With the development of network communication technology and the improvement of information processing device performance, it is desirable for terminal devices in a local area network (LAN) to realize rapid resource sharing and information exchange with external devices through peer-to-peer (P2P) communication and it is also desirable for the terminal devices to realize rapid recording and playback of music, video, etc. through interaction with other terminal devices within the LAN where the device is located. Due to above requirements, the UPNP function is usually set up on gateway devices. This function dynamically allocates ports to devices that require P2P communication to facilitate their communication with external devices, and also enables the UPNP protocol in the LAN controlled by the gateway device, such that terminal devices that support the UPNP architecture are capable of achieving rapid information sharing within the LAN.

The UPNP function on the gateway device is usually under two settings. One setting is where the UPNP function is turned on, which allows the gateway device to provide UPNP service for terminal devices connected thereto, thereby facilitating P2P communication between terminal devices and external devices, as well as information sharing within the LAN, etc. Although this setting is convenient for communication of terminal devices, there are certain security issues and this setting makes the gateway device susceptible to hacker attacks. For example, a terminal device may be infected with a virus, which may send a UPNP request to the gateway device to open the port. As the UPNP function is turned on, the gateway device automatically allocates a port for the communication of the virus, external devices may then communicate with the terminal device through the port, thereby destroying or stealing the information of the terminal device, and even attacking other devices in the LAN through the terminal device. Another setting is where the UPNP function is turned off, which makes the gateway device unable to provide UPNP service for terminal devices connected thereto. Although this setting is secure, it is difficult for terminal devices that require P2P communication with external devices and/or information sharing within the LAN to communicate smoothly and may make communication impossible, which seriously affects communication performance and user experience.

At present, some gateway devices may be manually configured, and users will need to configure the Internet Protocol (IP) address and/or media access control (MAC) address of the terminal device for which to turn on the UPNP function into the gateway device. In this way, when the gateway device receives the UPNP request message sent by these devices requesting for port allocation, ports may be allocated to these devices. However, as this setting relates to manual configuration, it is difficult for most users to realize it due to a lack of knowledge even if it may be realized, which is very inconvenient and time-consuming.

Therefore, it is desirable for a technology to be provided such that the gateway device is capable of automatically providing UPNP service to terminal devices requiring UPNP services in an intelligent manner.

SUMMARY OF THE INVENTION

Certain aspects of the present disclosure relate to a gateway device. The gateway device may comprise: a memory, in which instructions are stored; and a processor, configured to execute the instructions stored in the memory such that the gateway device executes the following operations. The operations include acquiring a device list comprising preset device type information related to a preset device type; acquiring terminal device information of a terminal device based on the terminal device connecting to the gateway device, and comparing the terminal device information with the preset device type information; determining that the terminal device information matches the preset device type information; and providing UPNP service to the terminal device based on the determination.

In some embodiments, the processor is further configured to execute the following operation: providing port allocation to the terminal device when receiving a UPNP request message from the terminal device for port allocation.

In some embodiments, the processor is further configured to execute the following operation: acquiring the device list from a preset uniform resource locator (URL) for storage in the gateway device at time of start-up of the gateway device.

In some embodiments, the processor is further configured to execute the following operation: periodically accessing the preset URL to check a version of the device list; and when it is determined that the version of the device list checked is different from a version of the stored device list, acquiring a new device list from the preset URL to override the stored device list.

In some embodiments, the information of each preset device type in the device list comprises at least one of an organizationally unique identifier (OUI) and a device name.

In some embodiments, the processor is further configured to execute the following operation: when one of the following conditions is met, determining that the terminal device information matches the preset device type information. The conditions comprise: a portion of the MAC address of the terminal device is the same as the organizationally unique identifier (OUI); a device name of the terminal device matches a device name included in the information in the device list; a portion of the MAC address of the terminal device is the same as the OUI, and a device name of the terminal device matches a device name included in the information in the device list.

In some embodiments, the preset device type indicates at least one of a device that requires peer-to-peer communication and a device that needs to communicate through the UPNP protocol within the LAN where the device is located.

Other aspects of the present disclosure relate to a method for providing universal plug and play (UPNP) service, a non-transitory computer-readable medium, and a computer program product. They are all capable of realizing the operations that the gateway device is capable of executing.

BRIEF DESCRIPTION OF THE ATTACHED DRAWINGS

For a better understanding of the present disclosure and to show how to realize the present disclosure, examples are herein described with reference to the attached drawings, in which.

SPECIFIC EMBODIMENTS

The following detailed description is made with reference to the attached drawings, and the following detailed description is provided to facilitate comprehensive understanding of various exemplary embodiments of the present disclosure. The following description includes various details for facilitation of understanding. However, these details are merely considered as examples, not for limiting the present disclosure. The present disclosure is defined by the attached Claims and their equivalents. The words and phrases used in the following description are only used to enable a clear and consistent understanding of the present disclosure. In addition, for clarity and brevity, descriptions of well-known structures, functions, and configurations may be omitted. Those of ordinary skill in the art will realize that various changes and modifications may be made to the examples described in the present specification without departing from the gist and scope of the present disclosure.

First, referring to FIG. 1, a schematic diagram of a gateway device including UPNP function and a network connected to the terminal device thereof according to an embodiment of the present disclosure will be described.

Figure 1:
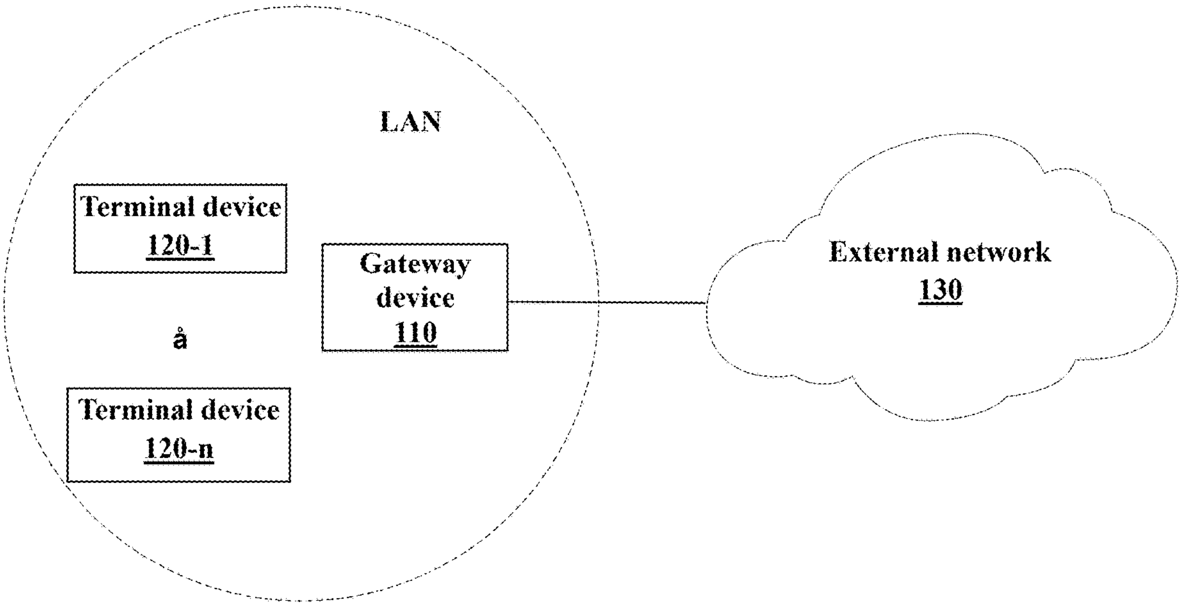
FIG. 1 is a schematic diagram of a gateway device including UPNP function and a network connected to the terminal device thereof according to an embodiment of the present disclosure.

As shown in FIG. 1, the gateway device 110 may be an access device or access point, such as a home gateway, and it may be located in the home, such as a house, factory, office, etc. of the user, thereby forming a home network or other various LANs. The LAN may be realized using the 802.11 protocol, for example, a Wi-Fi network. Through the gateway device 110, the access of terminal devices 120-1 to **120-*n* to an external network 130 may be controlled, and the terminal devices 120-1 to 120-*n* may also communicate with each other in the LAN covered by the gateway device. The gateway device 110 may be connected to the external network 130 through a wired method to receive data from and send data to the external network 130. The external network 130 may be a network including a packet data network, such as the Internet, private network, etc. A device that may be connected to the external network 130 may interact with the gateway device 110 or interact with terminal devices 120-1 to 120-*n* through the gateway device 110**.

The terminal devices 120-1 to **120-*n* may be connected to the gateway device 110 by adopting the 802.11 protocol or other wireless methods and may also be connected to the gateway device 110 through cables and other wired methods. These terminal devices may be smart phones, tablets, laptops, desktop computers, smart televisions, networked gaming consoles, printers, or other information processing devices that enable Internet functions, etc. They may enjoy network services provided by the external network 130 through the gateway device 110, or communicate with each other through the gateway device 110**.

Figure 2:
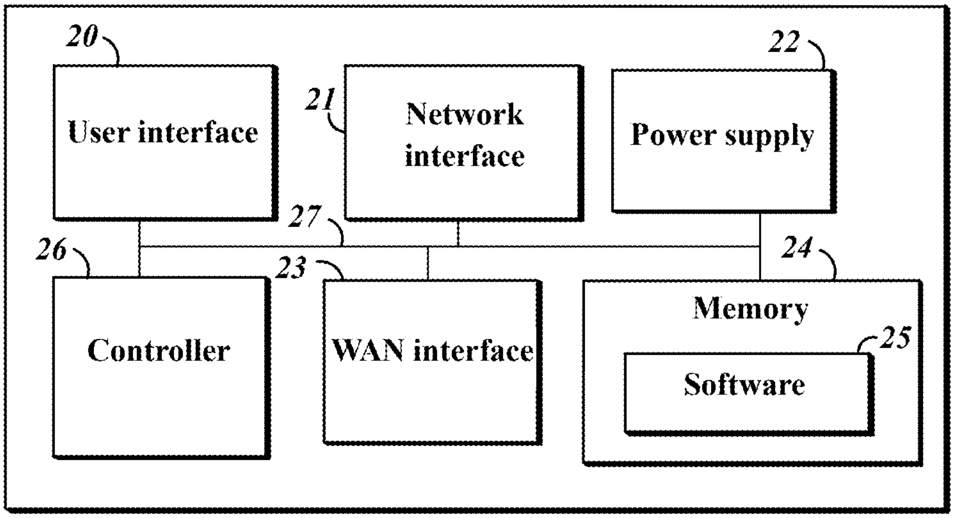
FIG. 2 is an exemplary configuration block diagram of the gateway device in FIG. 1 according to an embodiment of the present disclosure.

The gateway device 110 in FIG. 1 may have the exemplary configuration shown in FIG. 2. Although the device used to connect terminal devices to an external network is referred to as gateway device herein, the gateway device 110 may be, for example, a hardware electronic device capable of combining functions of a modem, access point and/or router. The present disclosure further proposes that the gateway device 110 may comprise but is not limited to, functions of a smart media device (SMD) or an IP/QAM set top box (STB) that is capable of decoding audio/video contents and playback contents provided by over-the-top (OTT) providers or multi-system operators (MSO).

As shown in FIG. 2, the gateway device 110 comprises a user interface 20, a network interface 21, a power supply 22, a wide area network (WAN) interface 23, a memory 24, and a controller 26. The user interface 20 may comprise but is not limited to push buttons, keyboards, keypads, liquid-crystal display (LCD) devices, cathode-ray tube (CRT) devices, thin-film transistor (TFT) devices, light-emitting diode (LED) devices, high-definition (HD) devices or other similar display devices, including display devices with touch screen capability, to allow interaction between the user and gateway device 110. The network interface 21 may comprise various types of network interface cards and circuits realized by software and/or hardware such that it is capable of communicating with a wireless extender device and a client device using one or a plurality of wireless protocols. The wireless protocols are, for example, any Institute of Electrical and Electronics Engineers (IEEE) 802.11 Wi-Fi protocol, Bluetooth protocol, Bluetooth Low Energy (BLE) or other short-range protocols operated in accordance with wireless technology standards to use any licensed or unlicensed frequency band, radio frequency for consumer electronics (RF4CE) protocol, ZigBee protocol, Z-Wave protocol, or IEEE 802.15.4 protocol to exchange data over a short distance. The licensed or unlicensed frequency band may be, for example, a Citizens Broadband Radio Service (CBRS) frequency band, 2.4 GHz frequency band, 5 GHZ frequency band, or 6 GHz frequency band.

The power supply 22 supplies power to internal components of the gateway device 110 via an internal bus 27. The power supply 22 may be a self-contained power source such as a battery pack, and it has an interface which is powered by (for example, directly or through other devices) an electrical charger connected to a socket. The power supply 22 may further comprise a removable rechargeable battery that allows for replacement, such as a nickel cadmium (NiCd), nickel metal hydride (NiMH), lithium (Li) ion or Li polymer battery. When the gateway device 110 is a modem or a gateway device, it may comprise the WAN interface 23, which may comprise various network interface cards and circuits realized by software and/or hardware so as to realize the communication between a router device and an Internet service provider or a MSO.

The memory 24 comprises a single memory or one or a plurality of memories or memory locations, including but not limited to a random access memory (RAM), a dynamic random access memory (DRAM), a static random access memory (SRAM), a read-only memory (ROM), an erasable programmable read-only memory (EPROM), an electrically erasable programmable read-only memory (EEPROM), a flash memory, a field programmable gate array (FPGA) logic block, a hard disk, or any other layers of a memory hierarchy. The memory 24 may be used to store any type of instructions, software or algorithms, including software 25 for controlling general functions and operations of the gateway device 110.

The controller 26 controls the general operations of the gateway device 110 and executes administrative functions related to other devices in the network (for example, extenders and client devices). The controller 26 may comprise, but is not limited to, a central processing unit (CPU), a hardware microprocessor, a hardware processor, a multi-core processor, a single-core processor, a microcontroller, an application-specific integrated circuit (ASIC), a digital signal processor (DSP), or other similar processing devices, which are capable of executing any type of instructions, algorithms, or software for controlling the operations and functions of the gateway device 110 according to the embodiments described in the present disclosure. The controller 26, such as a processor, may comprise various realizations of a digital circuit, an analog circuit, or a mixed signal (combination of analog and digital) circuit that executes functions in a computing system. The controller 26 may comprise, for example, a circuit, such as an integrated circuit (IC), a portion or circuit of a separate core, an entire core, a separate processor, a programmable hardware device such as a FPGA, and/or a system comprising a plurality of processors.

The internal bus 27 may be used to establish communication between the components of the gateway device 110 (for example, 20-22, 24, and 26).

Returning to FIG. 1, the gateway device 110 may have UPNP function. When the UPNP function is turned on, the gateway device 110 is capable of providing UPNP service for the terminal device connected thereto, such that the application running on the terminal device requests the gateway device 110 to allocate ports, such as the transmission control protocol (TCP) port or user datagram protocol (UDP) port to facilitate communication with the device on the external network 130, and the gateway device 110 is capable of allocating the corresponding port to the terminal device. The terminal device allocated with the port may then communicate with the device on the external network 130, for example via P2P communication. In addition, the gateway device 110 that turns on the UPNP function may also allow devices that support the UPNP architecture in the LAN to communicate with each other through the UPNP protocol, thereby realizing information sharing in the LAN. For example, when the file in the terminal device 120-1 is set to Share, other terminal devices in the LAN may access the file.

Although the turning on of the UPNP function helps in external communication and internal communication with the LAN, it may cause network security problems, allowing illegal devices to access the devices in the LAN through the ports opened via the UPNP service by the gateway device. On the other hand, although users may manually configure terminal information for whom the gateway device is required to turn on the UPNP function, it is very inconvenient and time consuming. Therefore, embodiments of the present disclosure provide a method for providing UPNP service such that the gateway device 110 is capable of automatically determining whether to turn on the UPNP function for terminal devices under the premise of security.

The flow of the method 300 used to provide UPNP service is described below with reference to FIG. 3. This method may be executed by the gateway device 110 to realize intelligent control of the UPNP function, so that the UPNP service is only turned on for terminal devices that require the UPNP service.

In S310, the gateway device acquires a device list that comprises information related to the preset device type.

The preset device type is the type of device that requires a gateway device to provide UPNP service thereto based on the actual application, which usually may include devices that require P2P communication, such as networked gaming consoles (such as Xbox, Nintendo Switch, etc.), as well as devices that need to communicate through the UPNP protocol within the LAN where the device is located to share information, such as audio/video player (such as ROKU series TV). When these types of devices are connected to gateway devices, including home gateways, the gateway device preferably provides UPNP service to these devices due to the need for smooth communication of these devices. For other devices that usually do not require UPNP service, the gateway device may not provide UPNP services thereto for security reasons.

Information related to a preset device type may be stored in a device list. The device list may comprise information related to each preset device type, for example, the organizationally unique identifier (OUI) of a device belonging to the preset device type, the device name of a device belonging to the preset device type, etc. OUI may correspond to a portion of the MAC address, for example, the first three bytes of the MAC address of a device belonging to a preset device type, or may be a another globally unique identifier specially set for the device belonging to this device type. The device name may be a string for indicating a device belonging to a preset device type, for example, the device name of Xbox series gaming consoles may be Xbox 360, Xbox Series S, Xbox Series X, etc., and the device name of the ROKU series may be ROKU xx TV (where "xx" indicates different labels of different series).

In different embodiments, the information related to the device type may only include OUI, or may only comprise the device name, and may also include both OUI and the device name. In addition, in each of the above circumstances, additional information may also be added to information related to the device type, regardless of whether the additional information is provided to the gateway device to determine whether to provide UPNP service. Additional information may be, for example, the name of the device manufacturer, the online access license identifier, etc.

Figures 3, 4:
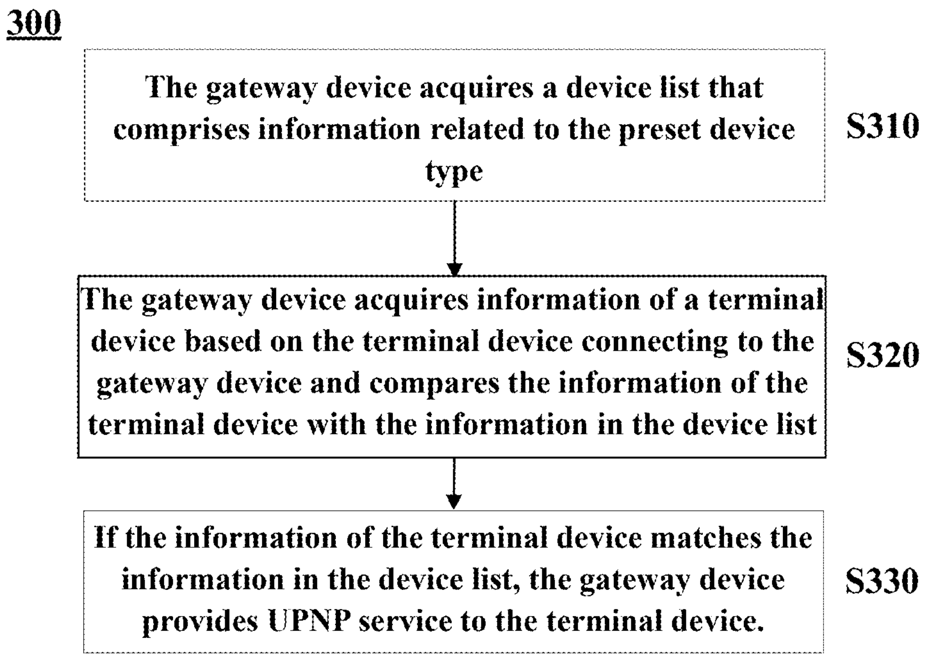
FIG. 3 is a flow chart of the method for providing UPNP service according to an embodiment of the present disclosure.
FIG. 4 is an example of a device list according to an embodiment of the present disclosure.

An example of a device list including several pieces of preset device type information is shown in FIG. 4. Each piece of preset device type information includes the OUI related to the preset device type (expressed in a hexadecimal in the figure) and the device name related to the preset device type. Those skilled in the art can understand that the device list may also include only one of OUI and device name, and may also include additional information. As shown in FIG. 4, the preset device type information related to each preset device type is recorded in each row of FIG. 4. The first row records the preset device type information related to a XBOX series networked gaming console, the second row records the preset device type information related to a ROKU series smart TV, and the third row records the preset device type information related to a iPad series tablet. Each piece of preset device type information includes the OUI and the device name of the corresponding preset device type. The OUI and device name given in FIG. 4 are for exemplary purposes only and are not limitative, and the device list may record more or less information on device type. When a new device type appears that requires UPNP service, related information may be added to the device list. When a device type that originally required UPNP service is no longer used due to technological progress, the corresponding information may be deleted from the device list.

This device list may be stored on a remote server (for example, a remote server located on the external network 130, a server managed by the gateway device manufacturer, etc.) and updated by maintenance personnel based on the addition of a new device type and/or the deletion of an old device type. The gateway device may acquire the device list from such remote servers. For example, when the gateway device starts up, the gateway device may acquire the device list from a preset uniform resource locator (URL). The preset URL points to a remote server that stores the device list and may be pre-stored in the gateway device. In this way, the gateway device may read the preset URL to acquire the device list from the remote server at time of start-up of the gateway device. The acquired device list may be stored in the gateway device to determine whether to provide UPNP service.

According to an embodiment of the present disclosure, when the gateway device stores the device list, the gateway device may periodically access the preset URL to check a version of the device list, thereby determining whether the device list has been updated. When it is determined that the version of the device list checked according to the preset URL is different from the version of the device list stored in the gateway device, the gateway device acquires a new device list from the preset URL to override the stored device list. In this way, it is ensured that the gateway device stores the latest device list, thereby providing UPNP service more accurately for different terminal devices.

In S320, the gateway device acquires information of the terminal device based on the terminal device connecting to the gateway device and compares the information of the terminal device with the information in the device list.

When a terminal device connects to the gateway device through wired or wireless methods, the gateway device acquires information of the terminal device therefrom, which comprises the MAC address, device name, etc. of the terminal device. For example, when the terminal device is connected to the gateway device, it sends a request message to the gateway device to request the gateway device to allocate an IP address thereto. The request message includes a MAC address, device name, etc., through which the gateway device acquires the information of the terminal device.

Then, the gateway device may compare the acquired information of the terminal device with the information in the device list acquired in S310. For example, in an embodiment, the gateway device may compare the OUI received from the terminal device with the QUI in the device list. When the same OUI is found in the device list, the information of the terminal device is determined to match the information in the device list. In another embodiment, the gateway device may compare the device name received from the terminal device with the device name in the device list. When a device name matches a device name of the received device list, for example, the same device name exists in the device list or the received device name conforms to the format of the device name in the device list (for example, the device name "ROKU12345TV" conforms to the format of "ROKU xx TV" or "ROKUxxTV"), the information of the terminal device is determined to match the information in the device list. In another embodiment, the gateway device may compare both the OUI and device name received from the terminal device with both the OUI and device name in the device list. When both match, i.e., the OUI is the same and the device name matches, the information of the terminal device is determined to match the information in the device list.

In the process of determining whether the information matches, all information recorded in the device list may not necessarily be used, as long as the corresponding information is compared according to the configuration of the gateway device (for example, comparing only OUI, comparing only the device name, or comparing both). For example, the device list may concurrently record the OUI and device name, but the configuration of the gateway device requires comparing OUI only to determine whether to provide the UPNP service, so the gateway device only compares the OUI in the received information of the terminal device with the information in the device list, and ignores the device name, so as to determine whether to provide UPNP service to the terminal device.

In S330, if the information of the terminal device matches the information in the device list, the gateway device provides UPNP service to the terminal device.

In the embodiments of the present disclosure, the UPNP function of the gateway device is turned off by default, that is, after the gateway device starts up, it does not provide UPNP service to any of the terminal devices connected thereto. However, this is not permanent, and may be changed by the results of the comparison process in S320. As mentioned above, when the information of the terminal device is determined to match the information in the device list based on a comparison of at least one of the OUI and device name, the gateway device may automatically turn on the UPNP function for the terminal device to provide UPNP service thereto. In this way, when the gateway device receives the UPNP request message for port allocation from the terminal device, the gateway device may automatically allocate the corresponding port to the terminal device or provide port allocation to the terminal device and notify the terminal device of the allocated port, so as to facilitate the communication of the terminal device.

If the result from the comparison process in S320 indicates that the information of the terminal device does not match the information in the device list, when the gateway device receives the UPNP request message from the terminal device for port allocation thereto, the gateway device rejects the port allocation request and may send the rejection message to the terminal device.

According to the above technical solution, the gateway device is capable of determining whether to provide UPNP service to the terminal device by acquiring a device list that records information related to the device type that requires UPNP service and comparing the information of the terminal device with the information in the device list obtained in advance when the terminal device is connected thereto. In this way, the UPNP function may be automatically turned on for terminal devices requiring UPNP service, and the UPNP function may remain turned off for other terminal devices, thereby realizing the intelligent control of whether to turn on the UPNP function, which ensures security of the gateway device in LAN access control and also allows smooth communication of terminal devices requiring P2P communication and/or video and audio sharing, etc.

Figure 5:
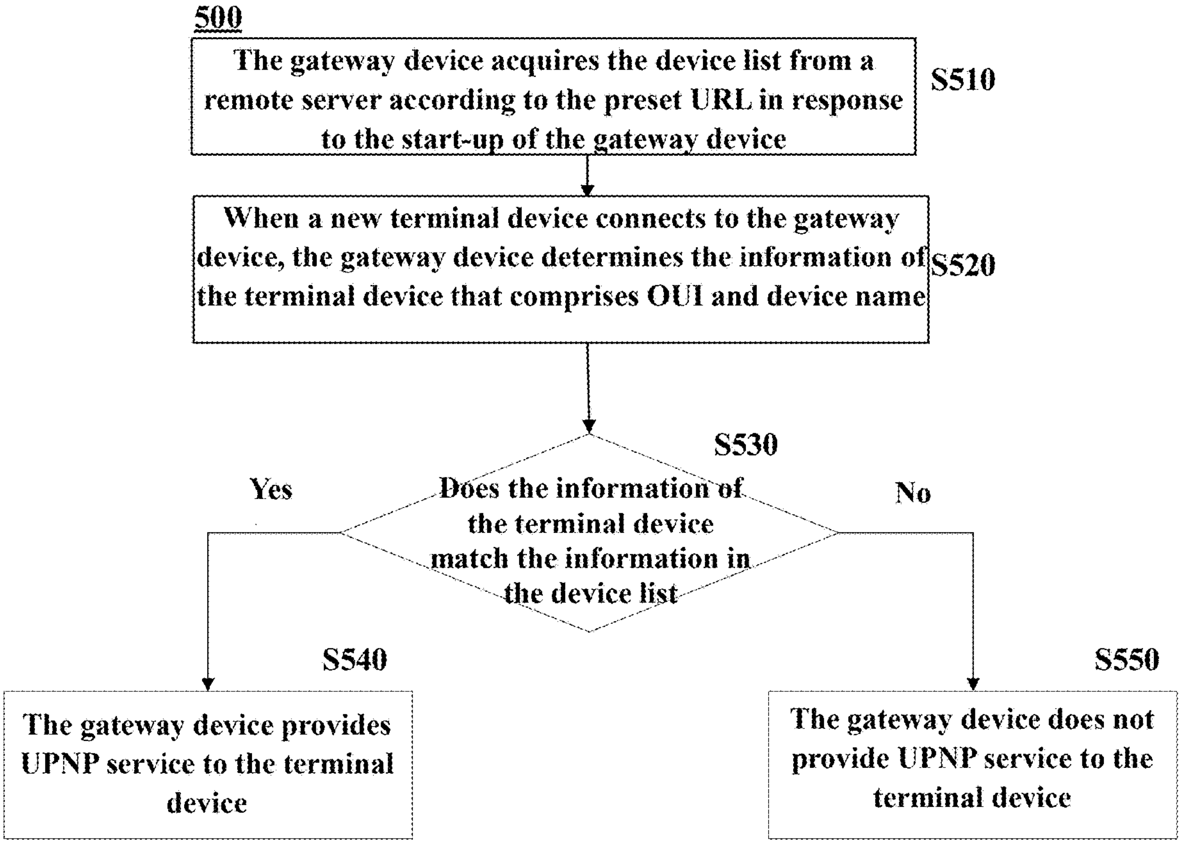
FIG. 5 is another flow chart of a method for providing UPNP service according to an embodiment of the present disclosure.

FIG. 5 shows a flow chart of a more complete method 500 for providing UPNP service according to an embodiment of the present disclosure. FIG. 5 will be described with reference to FIG. 1.

In S510, the gateway device 110 acquires the device list from a server on the external network 130 according to the pre-stored preset URL in response to the start-up of the gateway device 110. The device list comprises information about the device type that requires UPNP service, and information about each device type comprises at least one of OUI and device name. The UPNP function in the gateway device 110 is turned off by default. In addition, the gateway device 110 may periodically access the server to update the locally stored device list when the device list is updated.

In S520, when a new terminal device (for example, terminal device 120-*n*) is connected to the gateway device 110, the gateway device 110 receives the request message for IP address allocation from the terminal device 120-*n*, acquires information of the terminal device 120-*n*, comprising MAC address and device name, and determines the OUI of the terminal device 120-*n* based on the MAC address.

In S530, the gateway device 110 compares the information of the terminal device 120-*n* with the stored device list according to the configuration thereof to determine whether at least one of the OUI and device name in the information of the terminal device 120-*n* matches the corresponding items in the OUI and device name in the stored device list. If there is a match, the method 500 proceeds to S540. Otherwise, it proceeds to S550.

In S540, the gateway device 110 provides UPNP service to the terminal device 120-*n*. Thus, when the gateway device 110 receives the UPNP request message from the terminal device 120-*n*, it allocates the corresponding port to the terminal device 120-*n*, such that the terminal device 120-*n* is capable of carrying out P2P communication through the gateway device 110 or communicating with other devices that support the UPNP protocol in the LAN where the device is located.

In S550, the gateway device 110 does not provide UPNP service to the terminal device 120-*n*. Thus, when the gateway device 110 receives the UPNP request message from the terminal device 120-*n*, it rejects the request to allocate the corresponding port to the terminal device 120-*n* and keeps the UPNP function of the terminal device 120-*n* turned off.

Through the execution of method 500, the gateway device 110 is capable of automatically controlling whether to provide UPNP service to the terminal device connected thereto in an intelligent manner, thereby ensuring security in LAN access control by the gateway device and also ensuring the smooth communication of the terminal device requiring P2P communication and/or video and audio sharing, etc.

The present disclosure may be realized as any combination of devices, systems, integrated circuits, and computer programs on non-transitory computer-readable media. One or a plurality of processors can be realized as an integrated circuit (IC), an application specific integrated circuit (ASIC) or a large-scale integrated circuit (LSI), a system LSI, or a super LSI or super LSI component that performs part or all of the functions described in the present disclosure.

The present disclosure includes the use of software, applications, computer programs, or algorithms. Software, application programs, computer programs or algorithms may be stored on a non-transitory computer-readable medium, so that a computer with one or a plurality of processors may execute the aforementioned steps and the steps described in the attached drawings. For example, one or a plurality of memories may execute the software or algorithm that stores the instructions, and one or a plurality of processors may be connected to a set of instructions to execute the software or algorithm, so as to realize the intelligent control of UPNP function on the gateway device according to the solution provided by embodiments of the present disclosure and strike a balance between communication needs of devices that require UPNP service and network security.

Software and computer programs (also called programs, software applications, applications, components, or codes) comprise machine instructions for programmable processors, and may be realized in high-level procedural languages, object-oriented programming languages, functional programming languages, logic programming languages, or assembly languages or machine languages. The term "computer-readable medium" refers to any computer program product, apparatus or device used to provide machine instructions or data to the programmable data processor, e.g., magnetic disks, optical disks, solid-state storage devices, memories, and programmable logic devices (PLDs), including computer-readable media that receive machine instructions as computer-readable signals.

For example, the computer-readable medium may include the dynamic random access memory (DRAM), random access memory (RAM), read only memory (ROM), electrically erasable read only memory (EEPROM), compact disk read only memory (CD-ROM) or other optical disk storage devices, magnetic disk storage devices or other magnetic storage devices, or any other medium that may be used to carry or store the required computer-readable program codes in the form of instructions or data structures and may be accessed by a general or special computer or a general or special processor. As used herein, magnetic disks or disks include Compact Discs (CDs), laser disks, optical disks, Digital Versatile Discs (DVDs), floppy disks, and Blu-ray disks, in which magnetic disks usually copy data magnetically, and disks copy data optically via laser. Combinations of the above are also included in the scope of computer-readable media.

In one or a plurality of embodiments, the use of the words "may", "able", "operable as" or "configured as" refers to some devices, logics, hardware and/or elements designed to be used in a specified manner. The subject matter of the present disclosure is provided as an example of the device, system, method, and program for executing the features described in the present disclosure. However, in addition to the aforementioned features, other features or modifications may be expected. It may be expected that any emerging technology that may replace any of the aforementioned realization technologies may be used to complete the realization of the components and functions of the present disclosure.

In addition, the above description provides examples without limiting the scope, applicability, or configuration set forth in the claims. Without departing from the spirit and scope of the present disclosure, changes may be made to the functions and layouts of the discussed elements. Various embodiments may omit, substitute, or add various processes or components as appropriate. For example, features described with respect to some embodiments may be combined in other embodiments.

Similarly, although operations are depicted in a specific order in the attached drawings, this should not be understood as a requirement that such operations should be executed in the specific order shown or in the sequential order, or that all illustrated operations be executed to achieve the desired result. In some cases, multi-tasking and parallel processing may be advantageous.

The invention claimed is:

1. A gateway device, comprising:

a memory, in which an instruction is stored; and a processor, configured to execute the instructions stored in the memory such that the gateway device executes the following operations:

acquiring a device list comprising preset device type information related to a preset device type identifying terminal devices on the device list requiring a universal plug-and-play (UPNP) service;

acquiring terminal device information of a terminal device based on the terminal device connecting to the gateway device on a local area network (LAN), the terminal device initially configured to only communicate on the LAN, and comparing the terminal device information with the preset device type information;

determining that the terminal device information matches the preset device type information; and providing the UPNP service to the terminal device for communication with external devices outside of the LAN based on the determination.

2. The gateway device according to claim 1, wherein the processor is further configured to execute the following operation:

providing port allocation to the terminal device when receiving a UPNP request message from the terminal device for port allocation.

3. The gateway device according to claim 1, wherein the processor is further configured to execute the following operation:

acquiring the device list from a preset uniform resource locator (URL) for storage in the gateway device at time of start-up of the gateway device.

4. The gateway device according to claim 3, wherein the processor is further configured to execute the following operations:

periodically accessing the preset uniform resource locator (URL) to check a version of the device list; and when it is determined that the version of the device list checked is different from a version of the stored device list, acquiring a new device list from the preset uniform resource locator (URL) to override the stored device list.

5. The gateway device according to claim 1, wherein the information of each preset device type in the device list comprises at least one of an organizationally unique identifier (OUI) and a device name.

6. The gateway device according to claim 5, wherein the processor is further configured to execute the following operations:

when one of the following conditions is met, determining that the terminal device information matches the preset device type information:

a portion of the media access control (MAC) address of the terminal device is the same as the OUI;

a device name of the terminal device matches a device name included in the information in the device list; and a portion of the MAC address of the terminal device is the same as the OUI, and a device name of the terminal device matches a device name included in the information in the device list.

7. The gateway device according to claim 1, wherein the device list further comprises a preset device type identifying terminal devices that require peer-to-peer communication and terminal devices that need to communicate through the UPNP protocol within the LAN.

8. The gateway device according to claim 1, wherein the gateway device initially has the UPnP service turned off for all terminal devices on the LAN.

9. A method for providing universal plug-and-play (UPNP) service using a gateway device, the method comprising:

acquiring a device list that comprises preset device type information related to the preset device type identifying terminal devices on the device list requiring a universal plug-and-play (UPNP) service;

acquiring terminal device information of a terminal device based on the terminal device connecting to the gateway device on a local area network (LAN), the terminal device initially configured to only communicate on the LAN, and comparing the terminal device information with the preset device type information;

determining that the terminal device information matches the preset device type information; and based on the determination, providing the UPNP service to the terminal device for communication with external devices outside of the LAN.

10. The method according to claim 9, which further includes:

the gateway device providing port allocation to the terminal device when receiving a UPNP request message from the terminal device for port allocation.

11. The method according to claim 9, wherein acquiring the device list comprises:

the gateway device acquiring the device list from a preset uniform resource locator (URL) for storage in the gateway device at time of start-up of the gateway device.

12. The method according to claim 11, which further includes:

the gateway device periodically accessing device list from the preset uniform resource locator (URL) to check a version of the device list; and when it is determined that the version of the device list checked is different from a version of the stored device list, the gateway device acquiring a new device list from the preset uniform resource locator (URL) to override the stored device list.

13. The method according to claim 9, wherein the information of each preset device type in the device list comprises at least one of an organizationally unique identifier (OUI) and a device name.

14. The method according to claim 13, wherein when one of the following conditions is met, the terminal device information is determined to match the preset device type information;

a portion of the media access control (MAC) address of the terminal device is the same as the OUI;

a device name of the terminal device matches a device name included in the information in the device list; and a portion of the MAC address of the terminal device is the same as the OUI, and a device name of the terminal device matches a device name included in the information in the device list.

15. The method according to claim 9, wherein the device list further comprises a preset device type identifying terminal devices that require peer-to-peer communication and terminal devices that need to communicate through the UPNP protocol within the LAN.

16. A non-transitory computer-readable medium having an instruction stored therein, when executed by a processor, the instruction causing the processor to execute operations including the following:

acquiring a device list comprising preset device type information related to a preset device type identifying terminal devices on the device list requiring a universal plug-and-play (UPNP) service;

acquiring terminal device information of a terminal device based on the terminal device connecting to a gateway device on a local area network (LAN), the terminal device initially configured to only communicate on the LAN, and comparing the terminal device information with the preset device type information;

determining that the terminal device information matches the preset device type information; and providing the UPNP service to the terminal device for communication with external devices outside of the LAN based on the determination.

17. The non-transitory computer-readable medium according to claim 16, wherein, when executed by the processor, the instruction causes the processor to further execute operations including the following:

providing port allocation to the terminal device when receiving a UPNP request message from the terminal device for port allocation.

18. The non-transitory computer-readable medium according to claim 16, wherein, when executed by the processor, the instruction causes the processor to further execute operations including the following:

acquiring the device list from a preset uniform resource locator (URL) for storage in the gateway device at time of start-up of the gateway device;

periodically accessing the preset uniform resource locator (URL) to check a version of the device list; and when it is determined that the version of the device list checked is different from a version of the stored device list, acquiring a new device list from the preset uniform resource locator (URL) to override the stored device list.

19. The non-transitory computer-readable medium according to claim 16, wherein the information of each preset device type in the device list comprises at least one of an organizationally unique identifier (OUI) and a device name.

20. The non-transitory computer-readable medium according to claim 19, wherein, when executed by the processor, the instruction causes the processor to further execute operations including the following:

when one of the following conditions is met, determining that the terminal device information matches the preset device type information:

a portion of the media access control (MAC) address of the terminal device is the same as the OUI;

a device name of the terminal device matches a device name included in the information in the device list; and a portion of the MAC address of the terminal device is the same as the OUI, and a device name of the terminal device matches a device name included in the information in the device list.

* * * * *